US011069051B2

(12) United States Patent
Schauer

(10) Patent No.: US 11,069,051 B2
(45) Date of Patent: Jul. 20, 2021

(54) TRANSPARENT WAFER CENTER FINDER

(71) Applicant: Applied Materials, Inc., Santa Clara, CA (US)

(72) Inventor: Ronald Vern Schauer, Gilroy, CA (US)

(73) Assignee: Applied Materials, Inc., Santa Clara, CA (US)

(*) Notice: Subject to any disclaimer, the term of this patent is extended or adjusted under 35 U.S.C. 154(b) by 0 days.

(21) Appl. No.: 16/789,590

(22) Filed: Feb. 13, 2020

(65) Prior Publication Data
US 2020/0279363 A1 Sep. 3, 2020

Related U.S. Application Data

(60) Provisional application No. 62/812,785, filed on Mar. 1, 2019.

(51) Int. Cl.
*G06T 7/00* (2017.01)
*G06T 1/00* (2006.01)
*G06T 7/13* (2017.01)

(52) U.S. Cl.
CPC .......... *G06T 7/0004* (2013.01); *G06T 1/0014* (2013.01); *G06T 7/13* (2017.01); *G06T 2207/30148* (2013.01)

(58) Field of Classification Search
CPC ....... G06T 7/0004; G06T 1/0014; G06T 7/13; G06T 2207/30148; G06T 2207/10016;
(Continued)

(56) References Cited

U.S. PATENT DOCUMENTS 4,585,931 A 4/1986 Duncan et al.
4,819,167 A 4/1989 Cheng et al.
(Continued)

FOREIGN PATENT DOCUMENTS

JP 10-242250 9/1998
JP 2006-237501 A 9/2006
(Continued)

OTHER PUBLICATIONS

International Search Report and Written Opinion for International Application No. PCT/US2020/017882 dated Jun. 9, 2020.

*Primary Examiner* — Nizar N Sivji
(74) *Attorney, Agent, or Firm* — Patterson + Sheridan, LLP

(57) ABSTRACT

A method and apparatus for locating the center of a substrate are provided. The substrate-positioning system uses an array of visible light sources to illuminate the substrate and its edges. The light sources are non-laser in nature and typically emit in the visible spectrum. The light sources are typically LEDs so that the individual elements may be switched-on or switched-off extremely rapidly, which allows for multiple images to be taken using different light sources at any given substrate rotation position. The substrate-positioning system further includes an image sensor array with the ability to process data rapidly, which allows for the digitization (quantization) of each pixel being viewed. Algorithms analyze the values for patterns and determine the true edge position at each rotational angle of the substrate. The systems and methods described herein are able to locate the center of various types of substrates composed of different materials and/or edge types.

20 Claims, 7 Drawing Sheets

(58) Field of Classification Search
CPC ... G06T 2207/10152; G06T 7/73; G06T 1/00; G06T 1/0007; G06T 17/05; G06T 2207/10028; G06T 2207/10032; G06T 2207/10048; G06T 2207/20224; G06T 5/006; G06T 7/514; G06T 7/521; G06T 7/55; G06T 7/74; G06T 11/60

See application file for complete search history.

(56) References Cited

U.S. PATENT DOCUMENTS

| | | | |
|---|---|---|---|
| 5,267,017 A | 11/1993 | Uritsky et al. | |
| 5,452,078 A | 9/1995 | Cheng | |
| 5,479,252 A | 12/1995 | Worster et al. | |
| 5,497,007 A | 3/1996 | Uritsky et al. | |
| 5,563,520 A | 10/1996 | Terada | |
| 5,563,798 A | 10/1996 | Berken et al. | |
| 5,670,888 A | 9/1997 | Cheng | |
| 5,740,062 A | 4/1998 | Berken et al. | |
| 6,051,845 A | 4/2000 | Uritsky | |
| 6,275,742 B1* | 8/2001 | Sagues | H01L 21/681 414/936 |
| 6,393,337 B1 | 5/2002 | Perlov et al. | |
| 6,405,101 B1* | 6/2002 | Johanson | H01L 21/681 356/73 |
| 6,440,821 B1* | 8/2002 | Conboy | G03F 9/7003 257/E23.179 |
| 6,532,866 B2 | 3/2003 | Perlov et al. | |
| 6,718,227 B1* | 4/2004 | Schemmel | G03F 9/7088 700/189 |
| 7,280,200 B2* | 10/2007 | Plemmons | G01N 21/9503 250/559.06 |
| 7,346,415 B2 | 3/2008 | Ikeda et al. | |
| 7,620,232 B2* | 11/2009 | Sakai | G06T 7/001 382/141 |
| 7,672,502 B2 | 3/2010 | Osada et al. | |
| 8,064,070 B2 | 11/2011 | Schauer | |
| 8,135,560 B2 | 3/2012 | Schauer et al. | |
| 8,333,939 B2 | 12/2012 | Schauer | |
| 8,614,797 B2 | 12/2013 | Hellwig et al. | |
| 8,649,017 B2 | 2/2014 | Schauer | |
| 8,934,706 B2 | 1/2015 | Kiley et al. | |
| 8,958,907 B2 | 2/2015 | Saeki et al. | |
| 8,994,950 B2 | 3/2015 | Schauer | |
| 9,243,319 B2 | 1/2016 | Schauer et al. | |
| 10,041,789 B2 | 8/2018 | Baggett et al. | |
| 2004/0004699 A1* | 1/2004 | Kanatake | G03F 7/70075 355/45 |
| 2004/0056216 A1 | 3/2004 | Inenaga et al. | |
| 2005/0063580 A1* | 3/2005 | Zagatsky | G03F 9/7003 382/151 |
| 2006/0194406 A1* | 8/2006 | Ikeda | H01L 21/681 438/401 |
| 2006/0222236 A1* | 10/2006 | Osada | H01L 21/681 382/151 |
| 2009/0192633 A1 | 7/2009 | Schauer | |
| 2010/0106992 A1 | 4/2010 | Schauer | |
| 2010/0141755 A1* | 6/2010 | Iwanaga | G06T 7/33 348/94 |
| 2014/0111797 A1 | 4/2014 | Kitamura et al. | |
| 2014/0119595 A1 | 5/2014 | Gallo et al. | |
| 2015/0177625 A1* | 6/2015 | De Boer | G03F 9/7076 355/67 |
| 2017/0140525 A1* | 5/2017 | Benvegnu | G06T 7/0006 |
| 2018/0158854 A1 | 6/2018 | Tubert | |

FOREIGN PATENT DOCUMENTS

| | | |
|---|---|---|
| JP | 2006-278819 A | 10/2006 |
| KR | 10-1609695 | 4/2016 |

\* cited by examiner

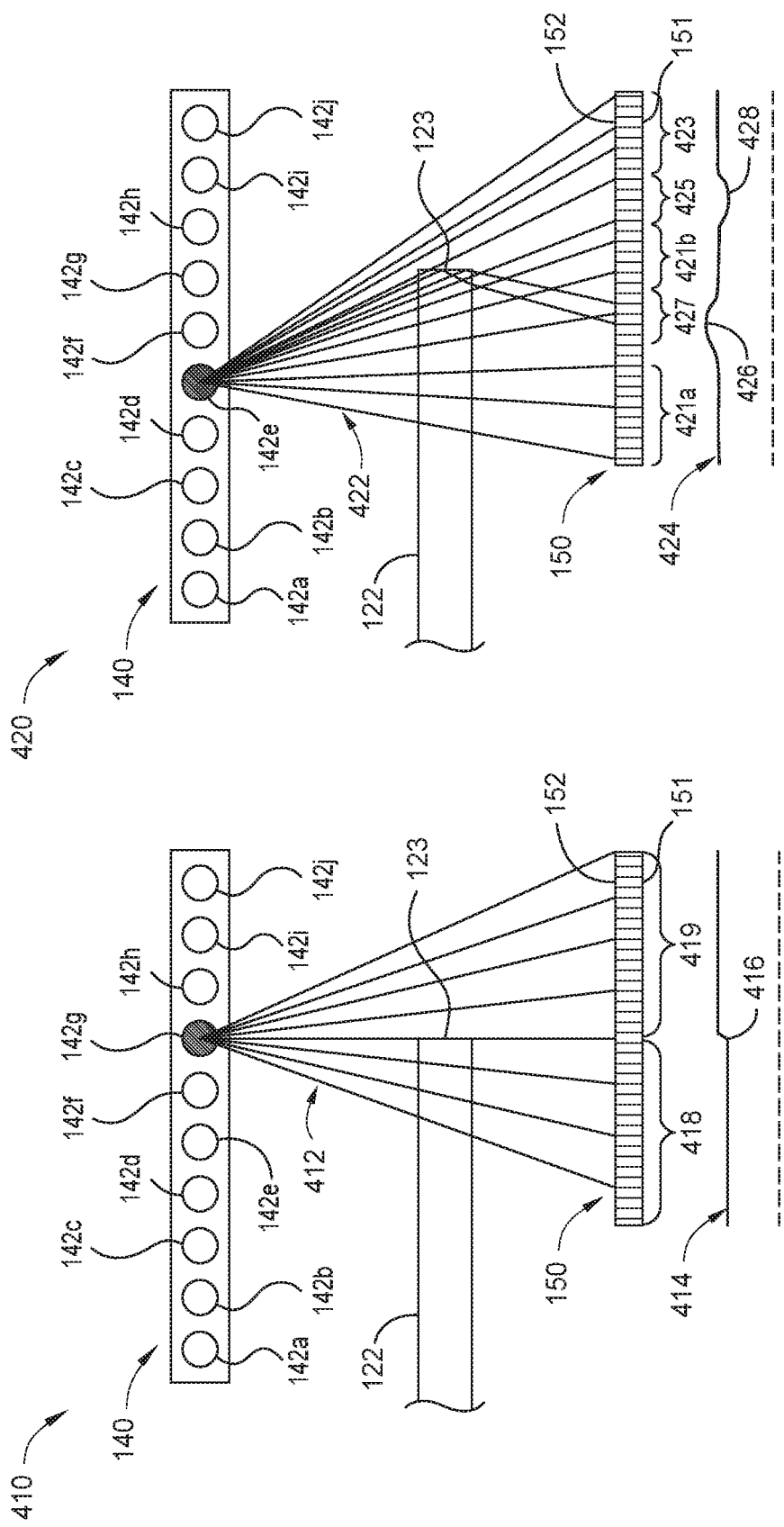

TRANSPARENT WAFER CENTER FINDER

CROSS-REFERENCE TO RELATED APPLICATIONS

This application claims benefit of U.S. provisional patent application Ser. No. 62/812,785, filed Mar. 1, 2019, which is incorporated herein by reference in its entirety.

BACKGROUND

Field

The disclosure generally relates to a substrate processing system, and more particularly to apparatus and methods for positioning substrates.

Description of the Related Art

Multi-chamber semiconductor manufacturing systems in which multiple substrates are integrated are being used in processing of substrates to manufacture semiconductor devices. In a multi-chamber manufacturing system, a substrate is transported between associated chambers with a transport robot. The system may include an orientation chamber that receives the substrate on a rotatable platen from the transport robot and detects the position and orientation of the substrate on the platen in order to facilitate placement of the substrate in subsequent chambers within the processing system.

Existing methods for orienting substrates typically have relied on either transmissive detection or reflective methods. Transmissive detection methods typically use collimated laser light sources. The shadow of the substrate is incrementally captured as the substrate is rotated on the platen. Reflective methods typically rely on the same general principal. However, with the advent of optically transparent substrates both transmissive and reflective methods have become unreliable.

Therefore, there is a need for improved systems and methods for locating the center of a wafer.

SUMMARY

The disclosure generally relates to a substrate processing system, and more particularly to apparatus and methods for positioning substrates. In one aspect, a system is provided. The system includes an array of visible light sources, each visible light source operable to emit visible light and positioned to illuminate an outer circumference of a substrate with visible light. The system further includes an image sensor array including a plurality of pixels operable to receive visible light and secondary emissions from the substrate and provide an output signal including pixel data. The system further includes a system controller operable to determine the center of the substrate based on at least three edge point coordinates of the substrate. The system controller is further operable to control rotation of the substrate to a rotational angular position. The system controller is further operable to control the array of visible light sources to perform multiple scans at each rotational angular position using different light source positions in the array of visible light sources. The system controller is further operable to analyze the pixel data received from the image sensor array for each scan to determine the at least three edge point coordinates.

Implementations may include one or more of the following. The visible light sources may be light-emitting diodes. The image sensor array may be a charge-coupled device (CCD) camera or a complementary metal-oxide semiconductor (CMOS) camera. The image sensor array may be a linear sensor array. The image sensor array may be a two-dimensional array. The substrate may be a transparent substrate.

In another aspect, an orientation chamber is provided. The orientation chamber includes a housing enclosing an interior volume. The orientation chamber further includes a rotatable platen disposed inside the housing including a substrate support surface operable to support a substrate. The orientation chamber further includes an array of visible light sources disposed above the rotatable platen, each operable to emit a visible light and positioned to illuminate an outer circumference of a substrate with the visible light. The orientation chamber further includes an image sensor array positioned below the rotatable platen. The image sensor array includes a plurality of pixels operable to receive the visible light and secondary emissions from the substrate and provide an output signal including pixel data. The orientation chamber further includes a system controller operable to determine the center of the substrate based on at least three edge point coordinates of the substrate. The system controller is further operable to control rotation of the substrate to a rotational angular position. The system controller is further operable to control the array of visible light sources to perform multiple scans at each rotational angular position using different light source positions in the array of visible light sources. The system controller is further operable to analyze the pixel data received from the image sensor array for each scan to determine the at least three edge point coordinates.

Implementations may include one or more of the following. The array of visible light sources may be positioned within the interior volume. The image sensor array may be positioned below the rotatable platen and external to the interior volume. The image sensor array may be positioned below the rotatable platen and within the interior volume. The visible light sources may be light-emitting diodes. The image sensor array may be a charge-coupled device (CCD) camera or a complementary metal-oxide semiconductor (CMOS) camera. The image sensor array maybe a linear sensor array. The image sensor array may be a two-dimensional array. The substrate may be a transparent substrate.

In another aspect, a method is provided. The method includes rotating a substrate positioned on a rotatable platen to a first rotational angular position. The method further includes performing multiple scans at the first rotational angular position using different light source positions in an array of visible light sources. The multiple scans comprise illuminating an outer circumference of the substrate with visible light supplied by the array of visible light sources disposed above the rotatable platen. The method further includes receiving the visible light from the visible light sources and/or secondary emissions from the substrate with a plurality of pixels disposed in an image sensor array. The image sensor array is positioned below the rotatable platen. The method further includes analyzing the pixel data received from the image sensor array to determine at least three edge point coordinates of the substrate.

Implementations may include one or more of the following. The method may further include performing multiple scans at additional rotational angular positions to obtain at least two more edge point coordinates. The method may further include determining a mathematical center of the substrate based on the at least three edge point coordinates. The method may further include transmitting the mathematical center as a position correction to a substrate-handling robot. The visible light sources may include light-emitting diodes. The image sensor array may be a charge-coupled device (CCD) camera or a complementary metal-oxide semiconductor (CMOS) camera. The image sensor array may be a two-dimensional array.

In another aspect, a non-transitory computer readable medium has stored thereon instructions, which, when executed by a processor, causes the process to perform operations of the above apparatus and/or method.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIGS. 4A-4C illustrate partial sectional views of the orienter chamber of FIG. 1 in operation while scanning a substrate to locate substrate edges according to one or more implementations of the present disclosure.

Figure 1:
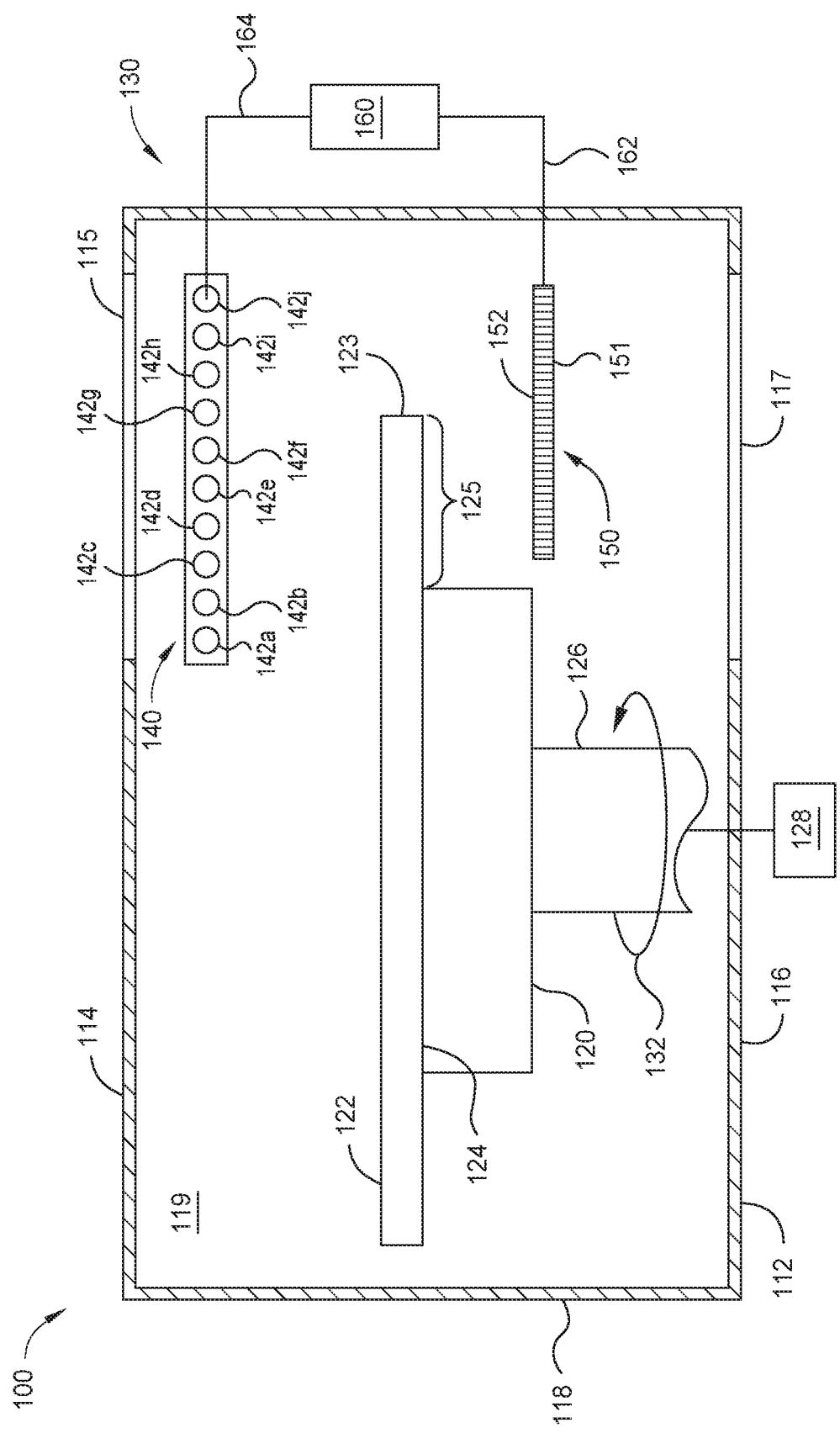
FIG. 1 illustrates a schematic cross-sectional view that depicts an orienter chamber including a substrate-positioning system according to one or more implementations of the present disclosure.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

The following disclosure generally relates to substrate processing systems, and more particularly to apparatus and methods for detecting the edges of a substrate, for example, optically transparent wafers, and deriving the true center of the substrate. Certain details are set forth in the following description and in FIGS. 1-6 to provide a thorough understanding of various implementations of the disclosure. Other details describing well-known structures and systems often associated with optical detection and substrate positioning are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

As used herein, the term "substrate" refers to a layer of material that serves as a basis for subsequent processing operations and includes a surface to be disposed for forming a metal layer thereon. The substrate may be a wafer, such as, for example a semiconductor wafer. The substrate may be a material such as crystalline silicon (e.g., Si<100> or Si<111>), silicon oxide, strained silicon, silicon germanium, doped or undoped polysilicon, doped or undoped silicon wafers, patterned or non-patterned wafers silicon on insulator (SOI), carbon doped silicon oxides, silicon nitride, doped silicon, germanium, gallium arsenide, glass, or sapphire. The substrate may comprise dielectric materials such as silicon dioxide ($SiO_2$), or a high-k dielectric material having a dielectric constant greater than 4.0, such as SiON, SiN, hafnium oxide ($HfO_2$), hafnium silicate ($HfSiO_2$), hafnium silicon oxynitride (HfSiON), zirconium oxide ($ZrO_2$), zirconium silicate ($ZrSiO_2$), barium strontium titanate ($BaSrTiO_3$, or BST), lead zirconate titanate ($Pb(ZrTi)O_3$, or PZT), and the like. The substrate can also include one or more nonconductive materials, such as silicon, silicon oxide, doped silicon, germanium, gallium arsenide, glass, and sapphire. The substrate can also include dielectric materials such as silicon dioxide, organosilicates, and carbon doped silicon oxides. The substrate may be transparent. Further, the substrate can include any other materials such as metal nitrides and metal alloys, depending on the application.

Implementations described herein will be described below in reference to an orienter chamber and process that can be carried out using a substrate processing system, such as an ENDURA® platform, a CENTURA® platform, a PRODUCER® platform, or an Applied Precision 5000 platform, all of which are available from Applied Materials, Inc. of Santa Clara, Calif. Other systems that benefit from center finding processes may also be adapted to benefit from the implementations described herein. The apparatus description described herein is illustrative and should not be construed or interpreted as limiting the scope of the implementations described herein.

Existing center finding methods typically rely on detection of edge shadows using a collimated laser light source and a linear camera array. The shadow of the substrate is incrementally captured as the substrate is rotated on a central pedestal. Reflective methods typically rely on similar principles. A map matrix of the edge positions verses rotation angle is used as an input to algorithms, which determine the mathematical center of the substrate. This mathematical center result is then transmitted as a position correction to the substrate-handling robot. Due to computational requirements, this can be time-consuming. With the advent of optically transparent substrates, either method (shadow or reflective) has become unreliable and difficult to tune due to a lack of general contrast.

Other attempts, including commercial off the shelf hardware have employed lasers to detect the substrate edge by reflectance or dispersion. These methods are somewhat better at detecting the edges of transparent substrates, but pose significant regulatory and safety concerns as well as being expensive to implement. Moreover, full integration of these systems into the substrate chamber or apparatus is challenging and therefore can be quite problematic to adapt and install, at best replacing a simple sensor array. These systems can also be extremely troublesome to tune.

Another problem is that the substrate is normally located inside a sealed chamber, typically but not always in vacuum. Thus, the center finder hardware has normally been purpose-designed for the task and adapted to look through viewing windows. The viewing windows are often thick quartz, which may cause secondary reflections as well as other issues. Because of the nature of the center finder, methods of supporting and rotating substrates, and the physical positions of the apparatus on a typical substrate-processing tool, it is advantageous to have a device or an array of devices viewing the substrate along a nominally vertical axis.

Yet another problem is that center finder hardware is expected to operate on any given substrate as the substrate transitions from optically clear to completely opaque in the course of substrate processing. Thus, the method of edge detection, trigger thresholds and even algorithms may need to change on an individual substrate as it passes through the center finder apparatus repeatedly in the course of being processed. In addition, since substrates will acquire surface patterning to create circuitry and devices, the patterning may confound reflective or surface image sensing methods, especially as the patterning is commonly in high alignment with wafer flats, notches, or other features by design.

Finally, in existing applications, which number in the tens of thousands, it is desirable to provide a center finder and hardware, which is "plug-and-play," not only from a physical standpoint, but also from a software and communication standpoint. Re-engineering the substrate processing system software and hardware on potentially thousands of systems to accommodate a new scheme is not practical. It is also desirable to have a solution that works for older installations and traditional opaque substrates to provide a solution for obsolescence issues.

In some implementations, the substrate-positioning system described herein includes an array of light sources. The array of light sources illuminates the outer circumference of the substrate, for example, the body and edges of the substrate. The array of light sources can include stable radiation sources, such as solid-state light sources that emit at a fixed wavelength are used either singly or in combination, as may be appropriate. Such light sources may be chosen to provide long and stable service (e.g., up to 500 to 1000 times the service of light sources used in conventional film detection devices). The light sources can be non-laser in nature and emit in the visible spectrum (e.g., 380 to 740 nanometers). Operation in the visible spectrum avoids regulatory issues and improves operator safety. In addition, operation in the visible spectrum also makes setup and maintenance far easier than would otherwise be possible. In one example, at least two separate wavelengths are used. In another example, three or more wavelengths are used. The light sources can be designed to turn-on in an extremely short time, so that they can be energized only for the brief time to take a measurement and make a determination (requiring no repeated calibrations), resulting in appreciable energy savings. The extremely rapid turn-on and brief use of the light sources allows for obtaining multiple images in a short time frame.

In one example, the array of light sources is comprised of light-emitting diodes ("LEDs) such that individual elements can be switched on and off extremely rapidly to permit multiple images to be taken using different light source angles at any given substrate rotation position. The array of light sources can be comprised of DIP (Dual In-Line Package) LEDs, SMD (Surface mounted diode) LEDs, COB (Chip on Board) LEDs, or combinations thereof, which permits multiple images to be taken at each location or in the course of multiple substrate rotations.

In some implementations, the array of light sources is replaced by a scanner device. The scanner device can include a rotating prism and focusing lens with a single LED source. The prism can be driven in a discontinuous manner with a stepper or servomotor to allow precise control of the position of the LED source. Driving the LED source in a discontinuous manner allows the single scanned light source to function as a pseudo array of LEDs.

In some implementations, the substrate-positioning system further includes one or more diffusers, and in some implementations, one or more narrow-band filters adapted for sensitivity to the type of substrate being positioned. The filter wavelengths can be different from the wavelengths emitted by the visible light sources since in some cases secondary or shifted emissions are reflected from the substrate. Selection of suitable filters can remove the need for special alignments. To assist in positioning, the substrate-positioning system can also include features that are adapted to block ambient light sources to reduce background signals. Additional devices to modify the optical path to reduce the effect of pattern geometry on substrates can also be included. Such devices can include but are not limited to, lenses, windows, collimators and diffusers. Automated (e.g., via control software) and/or manual mechanisms for controlling the intensity of energy emitted from the radiation sources and the gain of the detectors during operations can be provided in some implementations.

In some implementations, the system further includes an image sensor array. The image sensor array includes a plurality of pixels operable to receive the visible light from the visible light sources and/or secondary emissions from the substrate and provide an output signal. In some implementations, the image sensor array is a linear camera array. In other implementations, the image sensor array is a two-dimensional (X/Y) camera array. In one example, the image sensor array is a large format sensor, such as, for example, a digital single-lens reflex camera (DSLR)-style sensor. Large format sensors provide an extremely high transfer speed.

In some implementations, the system further includes logic and/or software operable to interface and control the substrate-positioning system described herein. The logic may include one or more logic circuits operable to receive the output signal. The logic may quantize each individual pixel that receives the visible light and/or secondary emission. The logic may then place the quantized pixel data into a memory array for evaluation. The logic then uses algorithms to analyze the values for patterns and determine the true edge position at each rotational angle of the substrate. Traditional algorithms, for example, a best fits center-finder method, may be used to analyze the values for patterns and determine the true edge position at each rotational angle of the substrate. For example, the "best fits center-finder method" essentially "draws" a perpendicular through the center points of at least two chords of the circle (preferably more) to see where the chords intersect. A tolerance window can be used to see if all of the perpendiculars cross. If so, the center of the window where they cross (best fit) is the center of the circle.

In some implementations, the system is operable to be integrated into a substrate processing chamber environment. In some implementations, the system includes purpose-made hardware that views through vacuum viewing windows and incorporates shielding against ambient light and secondary reflections. In some implementations, the processing core of the system controller controls the array of light sources, the transfer of quantized pixel data, and the rotation of the substrate on a pedestal or chuck to coordinate all aspects of the process.

In some implementations, the system performs a combination of immediate rapid processing of data pre-storage and processing of the stored data at the end of the rotation in order to compute the true substrate center point and the substrate's orientation. The system can either acquire data and store the data into high-speed memory for later processing, or analyze the data in real-time, which allows the system to acquire multiple images using different light sources for each rotational position of the substrate. While this process is discontinuous in real-time, from an operator's viewpoint the process may appear to be a continuous motion as the substrate rotates and images are acquired.

In some implementations, the system is designed to electrically interface to, or readily be adapted to interface to, all substrate-processing systems. This interface is designed to be simple in nature to enhance flexibility. The system can include an interactive and configurable system interface and use, for example, serial data transfer for communication with and/or control by a host system or controller. However, the presence and use of such interfaces is optional and not required for operation.

Implementations can include one or more of the following potential advantages. No special windows, fiber optics, vacuum seals or any other such items are required for installation and usage. The pre-existing vacuum seals of the chambers are not breached during installation or usage. This permits very rapid installation and service to be performed without changes to substrate fabrication processes or chambers.

FIG. 1 illustrates a schematic cross-sectional view that depicts an orienter chamber 100 including a substrate-positioning system 130 according to one or more implementations of the present disclosure. It should be appreciated that the orienter chamber 100 is only an example, and the substrate-positioning system 130 may be used in any chamber where it is desirable to find the true center of a substrate. The orienter chamber 100 includes a housing 112. The housing 112 can be constructed of any appropriate material, such as aluminum, stainless steel, titanium, and/or ceramic. Other suitable materials may be used. In some implementations, the housing 112 is formed from a metal, in a non-limiting example, from aluminum. The housing 112 encloses an interior volume 119. The interior volume 119 can be held in a vacuum state.

The housing 112 includes a top wall 114 or "ceiling," an opposing bottom wall 116 or "floor," and at least one sidewall 118. The top wall 114 includes a window 115, which allows for visibility of the interior volume 119. The bottom wall 116 includes a window 117, which allows for visibility of the interior volume 119. The windows 115, 117 can be comprised of any suitable material. In some implementations, the windows 115, 117 are composed of a quartz material.

A disk-shaped, rotatable platen, platen 120, is disposed horizontally inside the housing 112. The platen 120 is operable to support a substrate 122 on a substrate support surface 124. The platen 120 is a circular plate that holds the substrate 122 in a substantially horizontal orientation using a conventional vacuum chucking technique. Other well-known wafer retention techniques include electrostatic chucks, clamp rings, and the like can be used. A rotary shaft 126 is joined to the center of the underside of the platen 120. The rotary shaft 126 extends through the bottom wall 116 of the housing 112. The rotary shaft 126 is coupled with a motor 128, and the platen 120 can be rotated in the direction of arrow 132. In one example, the motor 128 is a stepper motor.

The substrate 122 is a wafer having an edge 123. The substrate 122 has an outer circumference 125 that includes the edge 123. The edge 123 of the substrate 122 is sharp, rounded, or beveled. In one example, the substrate 122 is a transparent substrate. In another example, the substrate 122 is an opaque substrate. In another example, the substrate 122 is a semitransparent or translucent substrate. In some implementations, the outer circumference 125 of the substrate 122 can be provided with a flat face (orientation flat section) or notches (notched section) to facilitate determining the orientation of the substrate 122. A change in the shape of the outer circumference 125 of substrate 122 (the orientation flat section or notched section, for example) or any eccentricity by the substrate 122 appears as a change in the position where a shadow zone is produced on the light-receiving surface 152 of the image sensor array 150. For example, if the substrate 122 is off-center (when the center of the substrate 122 and the center of rotation of the platen 120 are not aligned), when the substrate 122 rotates on the platen 120, the position where the shadow zone occurs on the light-receiving surface 152 changes.

The substrate-positioning system 130 includes an array of visible light sources 140, an image sensor array 150, and a system controller 160 for controlling the substrate-positioning system 130. The array of visible light sources 140 is positioned above the platen 120 to provide illuminating visible light (ray tracing 412, 422 and 432 in FIGS. 4A-4C) to at least a portion of the substrate 122, for example, the outer circumference 125 of the substrate 122. The array of visible light sources 140 includes a plurality of visible light sources 142a-j (collectively 142) each independently operable to provide illuminating light to the substrate 122.

Although ten visible light sources 142 are shown in FIG. 1, it should be appreciated that any number of visible light sources 142 may be used to provide the desired amount of illumination. For example, between 10 and 40 diodes, such as between 30 and 40 diodes, are mounted on one or more chips, such as an SMD chip, in a linear array. In one example, the diodes have approximately 1 to 2 millimeters between each adjacent diode. In some implementations, the LEDs are monochrome LEDs. The visible light sources 142 can be LEDs operable to emit light in the visible spectrum (e.g., wavelength from about 380 to about 740 nanometers). The visible light sources 142 can be selected from blue LEDs (e.g., wavelength from about 450 to 495 nanometers), green LEDs (e.g., wavelength from about 495 to 570 nanometers), red LEDs (e.g., wavelength from about 625 to 740 nanometers), or combinations thereof.

In some implementations, the visible light sources 142 are comprised of LEDs so the individual elements may be switched on and off extremely rapidly, which allows multiple images to be taken using different light source angles at any given substrate rotation position. For example, in some implementations, the visible light sources 142 have a turn-on and turn-off time within a range from about 800 picoseconds to about 50 nanoseconds, for example, within a range from about 2.5 nanoseconds to about 20 nanoseconds. The current source for the visible light sources 142 can be an active source or a passive source. In addition, transistor clamps may be used to achieve rapid switching of the visible light sources 142.

In some implementations, the array of visible light sources 140 is comprised of DIP (Dual In-Line Package) LEDs, SMD (Surface mounted diode) LEDs, COB (Chip on Board) LEDs, or combinations thereof. The visible light sources 142 can be mechanically constrained into the array of visible light sources 140. The array of visible light sources 140 can be in the form of linear array. The array of visible light sources 140 can further include collimating lenses. The array of visible light sources 140 can be a dense array of closely packed light sources. In one example, the array of visible light sources 140 uses SMD 0201 LED technology (e.g., 0.25 mm×0.125 mm). In another example, the array of visible light sources 140 uses SMD 0602 LED technology (e.g., 0.6 mm×0.2 mm).

In some implementations, the array of visible light sources 140 is a linear array, wherein the visible light sources 142 are positioned linearly. In some implementations, the array of visible light sources 140 is positioned in the interior volume 119 as shown in FIG. 1. The array of visible light sources 140 is positioned and supported in the interior volume 119 in proximity to the surface of the substrate 122, with enough clearance that the substrate 122 can be placed on or removed from the substrate support surface 124 by the robot blade of the transport robot. The array of visible light sources 140 can be supported by brackets or other mechanical support structures. In one example, the array of visible light sources 140 is mounted to the top wall 114.

In some implementations, the array of visible light sources 140 is positioned external to the interior volume 119. In implementations, where the array of visible light sources 140 is positioned external to the interior volume 119, the array of visible light sources 140 is positioned above the window 115. The array of visible light source 140 can be mounted to the window 115.

The image sensor array 150 is a device, which senses light of an optical image and then converts the optical image into electrical signals. The image sensor array 150 is positioned below the platen 120 to receive the visible light from the visible light sources 140 that illuminate the outer circumference 125 of the substrate 122. The image sensor array 150 may also receive secondary emissions from the substrate 122. The image sensor array 150 includes a light-receiving surface 152. The light-receiving surface 152 includes a plurality of light-receiving elements 151. Whether or not light is received can be determined at any position on the light-receiving surface 152. Any suitable light-receiving elements may be used. In one implementation, the plurality of light-receiving elements 151 include a plurality of Charge-Coupled Device (CCD) image sensors. In another implementation, the light-receiving elements 151 include a plurality of Complementary Metal-Oxide Semiconductor (CMOS) image sensors. It should be appreciated that the image sensor array 150 can be included in an image sensor assembly that includes, in addition to the image sensor array, one or more of a lens, a shutter mechanism, a filter, and the like. Some image sensor assemblies can include more than one lens, or the ability for a user to attach various lenses to the image sensor array that focus light on the light-receiving surface 152 of the image sensor array 150.

In some implementations, the image sensor array 150 has a high data output rate. For example, in some implementations, the image sensor array 150 has a data output rate on the order of 50 to 500 megabytes per second (MB/s), for example, on the order of 100 to 300 (MB/s) (800 to 2400 megabits per second).

CCD and CMOS image sensors are used in various applications such as consumer electronics (e.g., digital single-lens reflex (DSLR) cameras, cameras for mobile telephones, webcams and optical mice) and industrial applications (e.g., machine vision, security surveillance, automotive safety and control). CMOS image sensors are made up of an array of pixels. Each pixel, also referred to as a pixel structure, has a photodetector, which converts light energy into electrical charge. The electrical charge is then transferred and converted into a voltage signal using the transistors in the pixel structure. The voltage signal may then be converted into a digital signal by an analog-to-digital converter (ADC) in the read circuit of the image sensor.

The image sensor array 150 includes a plurality of pixels operable to receive visible light from the visible light sources 140 and provide an output signal. In some implementations, the image sensor array 150 is a linear camera array. Examples of suitable linear camera arrays include 1×1024 pixel arrays and 1×2048 pixel arrays. In some implementations, the image sensor array 150 is a two-dimensional ("2D") camera array. In one implementation, the image sensor array is a digital camera X/Y image sensor. Examples of a suitable digital camera X/Y sensor include 6.6 Megapixel CMOS Image Sensors, such as the NOII4SM6600A CMOS image sensor, which is manufactured by ON Semiconductor®.

In some implementations, the image sensor array 150 is positioned in the interior volume 119 as shown in FIG. 1. The image sensor array 150 can be mounted to the bottom wall 116. In some implementations, the image sensor array 150 is positioned external to the interior volume 119. In implementations, where the image sensor array 150 is positioned external to the interior volume 119, the image sensor array 150 is positioned below the window 117. In some implementations where the image sensor array 150 is positioned below the window 117, the image sensor array 150 can be mounted to the window 117.

Generally, the orienter chamber 100 further includes a system controller 160 configured to control the automated aspects of the orienter chamber 100. The system controller 160 facilitates the control and automation of the overall orienter chamber 100 and may include a central processing unit (CPU), memory, and support circuits (or I/O). Software instructions and data can be coded and stored within the memory for instructing the CPU. A program (or computer instructions) readable by the system controller 160 determines which tasks are performable on a substrate. In some implementations, the program is software readable by the system controller 160, which includes code to generate and store at least substrate positional information, the sequence of movement of the various controlled components, and any combination thereof. Additional details about the system controller 160 are discussed with reference to FIG. 2.

Depending upon the type of image sensor used for the image sensor array 150, quantization may be performed by the image sensor array 150 and/or the system controller 160. In some implementations, the image sensor array 150 performs quantization of the data (e.g., analog light intensity) and outputs the data in a digital quantized format. In some implementations, the image sensor array 150 outputs pixel data in 24-bit packets including an 8-bit value for each of red, green, and blue. In some implementations, 8 to 24 bits is used for the quantized light intensity. The digital data is streamed out over one or more bit channels to the system controller 160.

Figure 2:
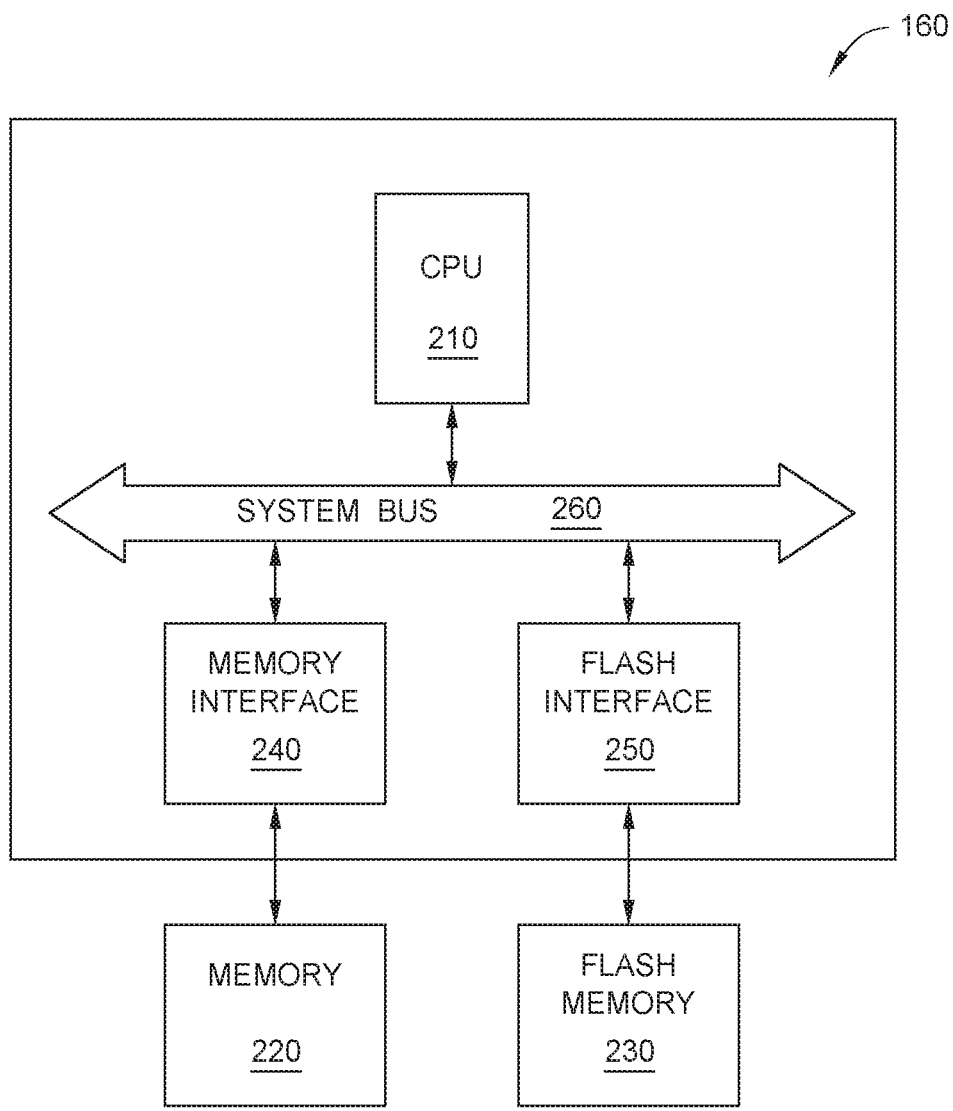
FIG. 2 illustrates a schematic view of a system controller operable to implement one or more implementations of the present disclosure.

FIG. 2 illustrates a schematic view of the system controller 160 operable to implement one or more implementations of the present disclosure. The system controller 160 may be coupled to the image sensor array 150 via cabling 162, such as a multi-channel data link, and to the array of visible light sources via cabling 164. The system controller 160 includes instructions for analyzing the light received by the image sensor array 150 in order to analyze the orientation and position of the substrate 122. In some implementations, the system controller 160 is operable to receive an output signal and quantize each individual pixel that receives the light. The quantized pixel data is then placed into a memory array for evaluation. In some implementations, the system controller 160 is part of an integrated circuit package that provides an interface to a printed circuit board that includes external interconnect to the other components of the orienter chamber 100.

The system controller 160 may include a processor, logic circuitry, and/or any combination of hardware and software that is adapted to use the orienter chamber 100 and/or substrate-positioning system 130 to execute the methods of the present disclosure. For example, the system controller 160 can include program code that is operable to activate the array of visible light sources 140 to illuminate a substrate in response to receiving a signal indicating the center-finding should begin (e.g., a substrate is expected to be present). The system controller 160 can include program code that is operable to use the array of visible light sources 140 and the image sensor array 150 to locate the edges and center of a substrate in the chamber in accordance with the methods detailed below with respect to FIGS. 3-5. In some implementations, the system controller 160 can include program code that is operable to send a signal to a host system or system controller 160 indicating that the center of a substrate has been located based upon receiving one or more signals from the image sensor array 150 indicating the detection of a certain wavelength of radiation energy received reflected from the substrate. The system controller 160 can include program code that is adapted to calibrate the orienter chamber 100 and/or substrate-positioning system 130, to control the intensity of the visible light sources in the array of visible light sources 140, and/or to adjust the gain of the sensors in the image sensor array 150. The system controller 160 can also include interface ports, memory, clocks, power supplies, and other components to support operation of the system controller 160.

Turning to FIG. 2, in some implementations, the system controller 160 includes a central processing unit (CPU) 210, memory 220, a flash memory 230, a memory interface 240, a flash interface 250, and a system bus 260. Each of the components of the system controller 160 may communicate with one or more of the other components via the system bus 260.

In one example, the CPU 210 is a reduced instruction set computer (RISC) such as an ARM™ Cortex-A9 32-bit multi-core microprocessor. The CPU 210 has one or more cores (e.g., 1, 2, 4, etc.) and may be multi-threaded to execute two or more instructions in parallel. In other implementations, the CPU 210 may be a MIPS based microprocessor or other type of RISC processor.

The memory 220 includes one or more memory modules for temporary storage of volatile data. In one implementation, the memory 220 includes one or more dynamic random access memory (DRAM) modules. In one example, the flash memory 230 includes a flash memory device and provides non-volatile, long-term storage of data. In another implementation, the flash memory 230 may be replaced with other types of non-volatile memory such as read-only memory (ROM), solid-state drives, optical discs (e.g., CD-ROM), SD (Secure Digital) cards, and the like. It should be appreciated that data, as used herein, refers to both program instructions and raw data processed by the instructions.

In some implementations, the CPU 210 retrieves data from the memory 220 via the memory interface 240. The memory interface 240 includes a cache for temporary storage of data from the memory 220. In one example, the memory interface 240 implements a 32-bit DDR (double data rate) DRAM interface that connects to the memory 220. The CPU 210 can also retrieve data from flash memory 230 to be written into the memory 220 via the flash interface 250 that, in one implementation, implements an Open NAND Flash Interface (ONFI) specification, version 3.1. It should be appreciated that the flash interface 250 can be replaced by other types of interfaces for flash memory or other non-volatile memory devices, as required to interface with the particular type of non-volatile memory included in the system controller 160. For example, the flash interface 250 could be replaced by an IDE (Integrated Drive Electronics) interface (e.g., Parallel ATA) for connection to a solid-state drive (SSD) in lieu of the flash memory 230.

The system controller 160 may further include one or more other I/O interfaces, including, for example, an Industry Standard Architecture (ISA) interface, a Small Computer Serial Interface (SCSI) interface, an Inter-Integrated Circuit ($I^2C$) interface, a System Packet Interface, (SPI), a Universal Serial Bus (USB), controller area network (CAN) bus; another interface, or combinations thereof.

Although shown as a single system controller 160, it should be appreciated that multiple system controllers may be used with the implementations described herein. For example, in one implementation, a first controller controls imaging and a second controller controls automation.

Figure 3:
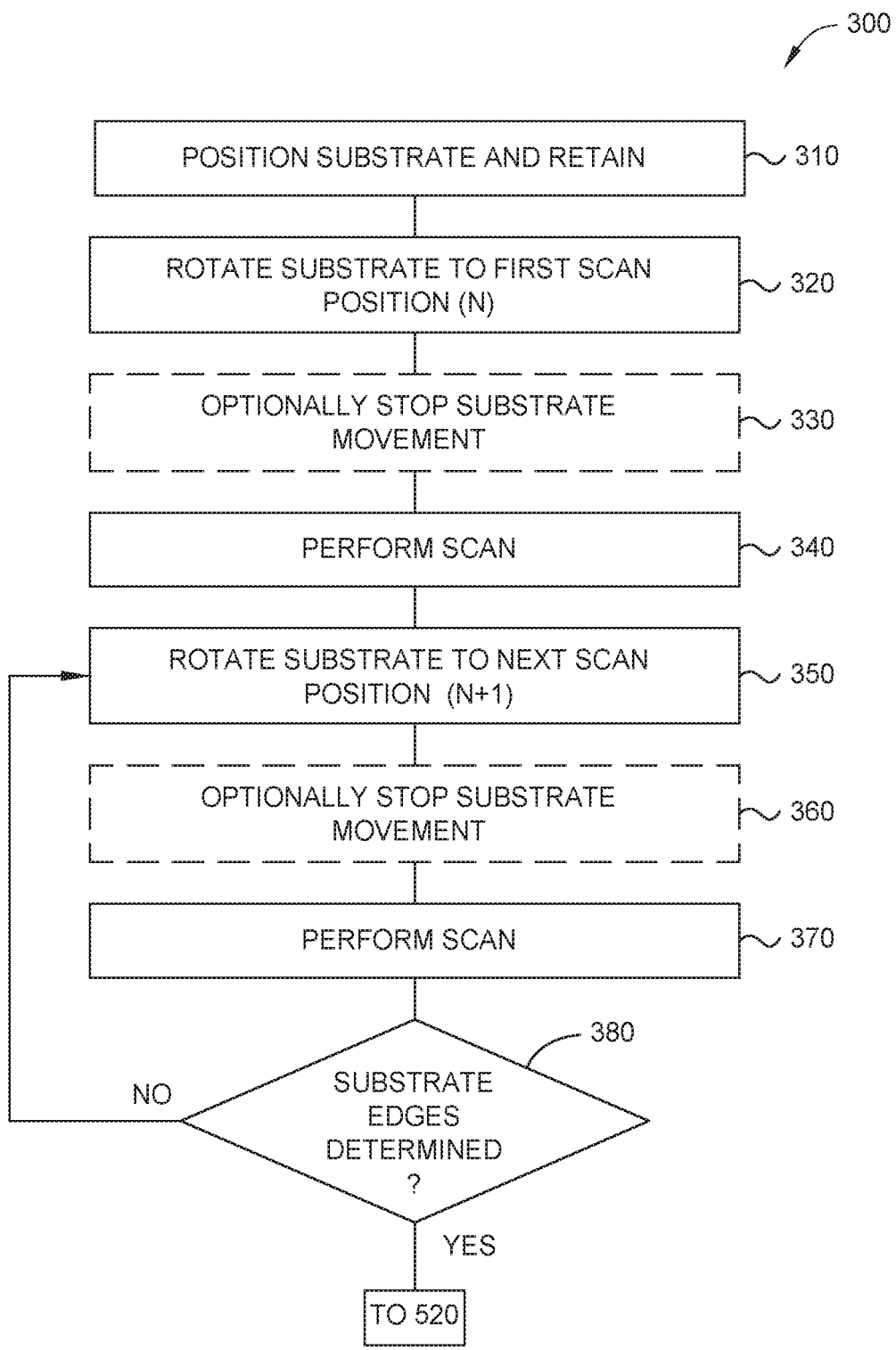
FIG. 3 illustrates a flow diagram of a method for determining substrate edges according to one or more implementations of the present disclosure.

FIG. 3 illustrates a flow diagram of a method 300 for determining substrate edges according to one or more implementations of the present disclosure. The method 300 may be executed as a software routine by the system controller 160 and the substrate-positioning system 130. The method 300 is used to determine the location of at least three edge point coordinates, which may be used to determine the center of the substrate 122. In some implementations, where the substrate 122 includes a flat or a notch, the flat or notch functions as a fourth coordinate. In one example, as many as 200 to 500 sample position data sets are acquired, for example, a position for every 1.8 degrees of rotation.

At operation 310, a substrate is positioned on and retained by a platen, such as platen 120. Substrate retention is generally accomplished using a vacuum chuck, but may be accomplished using an electrostatic chuck, edge clamp, and the like. At operation 320, the platen and the substrate are rotated to a first scan position (N). The first scan position (N) is a known angular position, for example, 0 degrees, 15 degrees, 30 degrees, etc. Optionally, at operation 330, the platen and the substrate are stopped at the first scan position (N).

At operation 340, a scan is performed. In some implementations, the scan is performed while the platen and substrate are stopped at the first scan position (N). In other implementations, the scan of operation 340 is performed while the substrate is in motion, for example, while the substrate is rotating. In some implementations, operation 340 performs multiple scans at each known angular position using differing light source positions in the array of visible light sources 140. In some implementations, multiple images are acquired using different light sources from the array of visible light sources 140 during the scan for a given angular position. The scan will be described below with reference to FIGS. 4A-4C.

Figure 4C:
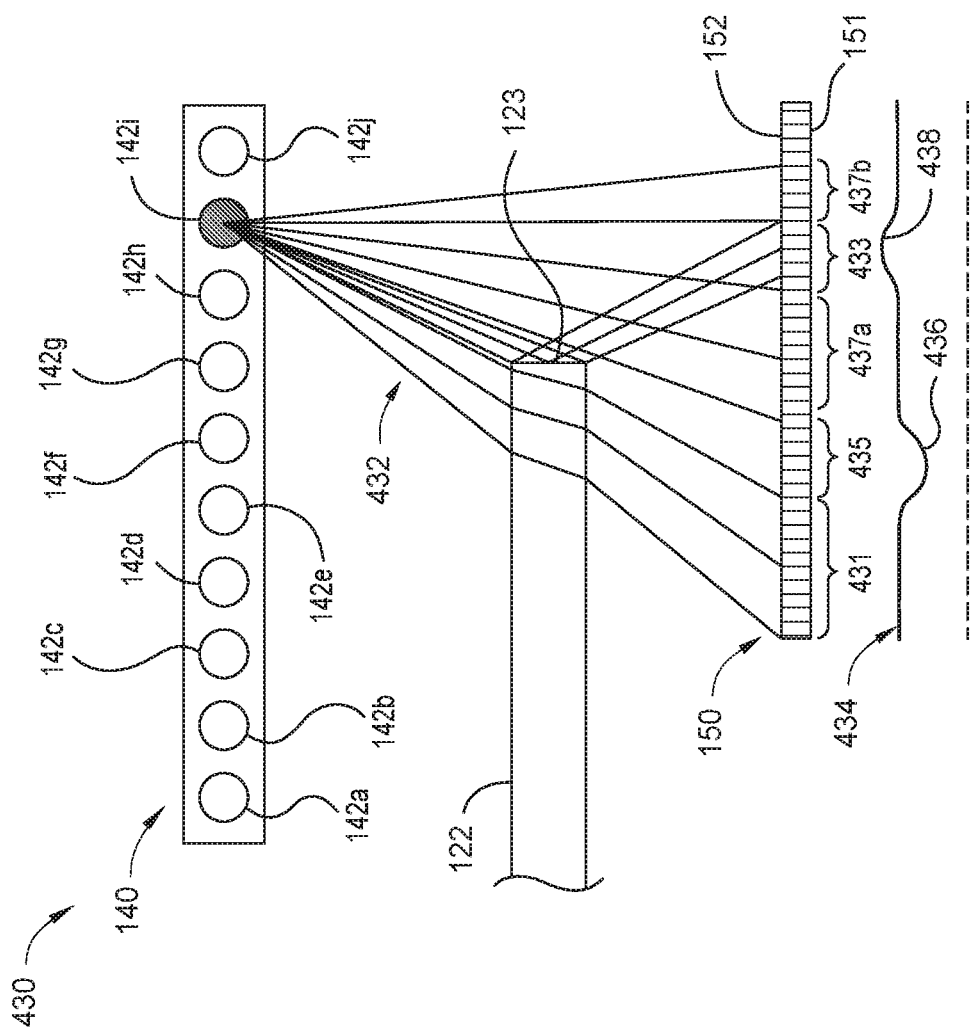

As depicted in FIGS. 4A-4C, during the scan, the substrate 122 and the edge 123 of the substrate 122 are illuminated by one or more visible light sources of an array of visible light sources, such as the array of visible light sources 140. The substrate 122 may be illuminated by pulses of visible light that are sequential, simultaneous, and/or overlapping. For example, in FIGS. 4A-4C, three different light source positions are used to determine the true edge 123 of the substrate 122. The individual visible light sources, such as the individual visible light sources 142a-142j, of the array of visible light sources 140 may be switched on and off extremely rapidly, which allows multiple images to be taken by an image sensor array, such as the image sensor array 150, using multiple visible light source angles at each scan position (N, N+1, N+2, N+3, . . . ). Each individual pixel of the image sensor array 150 being viewed is subject to digitization (quantization). The resulting values may then be placed into a memory array for evaluation. Algorithms then analyze the values of, for example, slopes, averages, and pattern shapes, to determine the true edge position at each rotational angle of the substrate 122. The scan may be performed at each location or in the course of multiple rotations of the substrate 122, as the situation requires.

In some implementations, an entire quantized linear scan at each tested rotational angular position is stored for later analysis. In one example, 20 or more samples are obtained at each tested angular position, for example, as many as 30 or more samples, such as 50 or more samples per each tested rotational angular position. In some implementations where there are multiple scans at each position using differing light source positions, the edge-finding algorithms will not rely upon a simple fixed threshold, but rather will examine slopes, averages and pattern shapes in the sample set to determine the true edges of the substrate. In some implementations, the edge-finding algorithms are adaptive. For example, in processes where a substrate may start out transparent and end up opaque (such as LED production and silicon carbide or silicon-on-sapphire high power transistors), adaptive edge-finding algorithms may be used to locate edges as the substrate characteristics change.

Turning to FIG. 4A, a cross-sectional view illustrating a ray trace diagram 410 of the orienter chamber 100 in operation is provided. The ray trace diagram 410 of FIG. 4A depicts ray tracing 412 directing visible light of a first wavelength from visible light source 142g toward the edge 123 of the substrate 122 at a known angular position of the substrate 122. As the ray tracing 412 indicates, in the case where the substrate 122 is a transparent substrate, the visible light may be refracted by the substrate 122 in areas where the substrate 122 is present, which is defined as a refraction zone 418, and pass through unrefracted by the substrate 122 in areas where the substrate 122 is not present, which is defined as a transmission zone 419. The refracted radiation and unrefracted radiation are detected by the image sensor array 150. An output signal 414 is generated, which illustrates a transition 416 from the refraction zone 418 to the transmission zone 419. The transition 416 identifies the edge 123 or is slightly offset from the edge 123.

Turning to FIG. 4B, a cross-sectional view illustrating another ray trace diagram 420 of the orienter chamber 100 in operation is provided. The ray trace diagram 420 of FIG. 4B depicts ray tracing 422 directing visible light of a first wavelength from visible light source 142e toward the edge 123 of the substrate 122 at the known angular position of the substrate 122. As the ray tracing 422 indicates, in the case where the substrate 122 is a transparent substrate, the visible light may be refracted by the substrate 122 in areas where the substrate 122 is present, which is defined as a refraction zone 421a, 421b (collectively 421); the visible light may pass through unrefracted by the substrate 122 in areas where the substrate 122 is not present, which is defined as a transmission zone 423; the visible light may be blocked by the edge 123 of the substrate 122, which is defined as a shadow zone 425; and the visible light may be reflected by the edge 123 of the substrate 122, which is defined as a reflection zone 427. The refracted radiation, reflected radiation, and unrefracted radiation are detected by the image sensor array 150. An output signal 424 is generated, which illustrates a first transition 426 where radiation reflected by the edge 123 of the substrate 122 is detected, such as the reflection zone 427, by the image sensor array 150 and a second transition 428 where radiation is not detected by the image sensor array 150, such as the shadow zone 425. The edge 123 is located roughly equidistant between the slopes contained between the first transition 426 and the second transition 428.

Turning to FIG. 4C, a cross-sectional view illustrating another ray trace diagram 430 of the orienter chamber 100 in operation is provided. The ray trace diagram 430 of FIG. 4C depicts ray tracing 432 directing visible light of a first wavelength from visible light source 142i toward the edge 123 of the substrate 122 at the known angular position of the substrate 122. As the ray tracing 432 indicates, in the case where the substrate 122 is a transparent substrate, the visible light may be refracted by the substrate 122 in areas where the substrate 122 is present, which is defined as refraction zone 431; the visible light may be reflected by the edge 123 of the substrate 122, which is defined as a reflection zone 433; the visible light may be blocked by the edge 123 of the substrate 122, which is defined as a shadow zone 435; and the visible light may be and/or pass through neither unrefracted or unreflected by the substrate 122 in areas where the substrate 122 is not present, which is defined as a transmission zone 437a, 437b (collectively 437). The refracted radiation, reflected radiation and unrefracted radiation are detected by the image sensor array 150. An output signal 434 is generated, which illustrates a first transition 436 where radiation is not detected by the image sensor array 150, such as the shadow zone 435, and a second transition 438 where radiation reflected by the edge 123 of the substrate 122 is detected by the image sensor array 150, such as the reflection zone 433. The edge 123 is located roughly equidistant between the slopes contained between the first transition 436 and the second transition 438. The profiles depicted in FIGS. 4A-4C may be combined to form an average.

After the scan at operation 340 is completed, the platen and the substrate may be rotated to the next scan position (N+1). The next scan position (N+1) is a known angular position, for example, 0 degrees, 15 degrees, 30 degrees, etc. Optionally, at operation 360, the platen and the substrate are stopped at the second scan position (N+1) where a scan is performed at operation 370 while the platen and substrate are stopped at the next scan position (N+1). The scan at operation 370 may be performed similarly to the scan at operation 340. At operation 380, if the edges of the substrate have been determined, the process may proceed to method 500 where the center of the substrate is determined based on the location of the edges determined by method 300. If the edges of the substrate have not been determined, the process returns to operation 350 where the substrate is rotated to the next known angular position (N+2, N+3, N+4 . . . ) where additional data is obtained. Operations 350-370 may be repeated until the substrate edges are determined. In some implementations, at least one complete rotation of the substrate 122 is performed during method 300.

Figure 5:
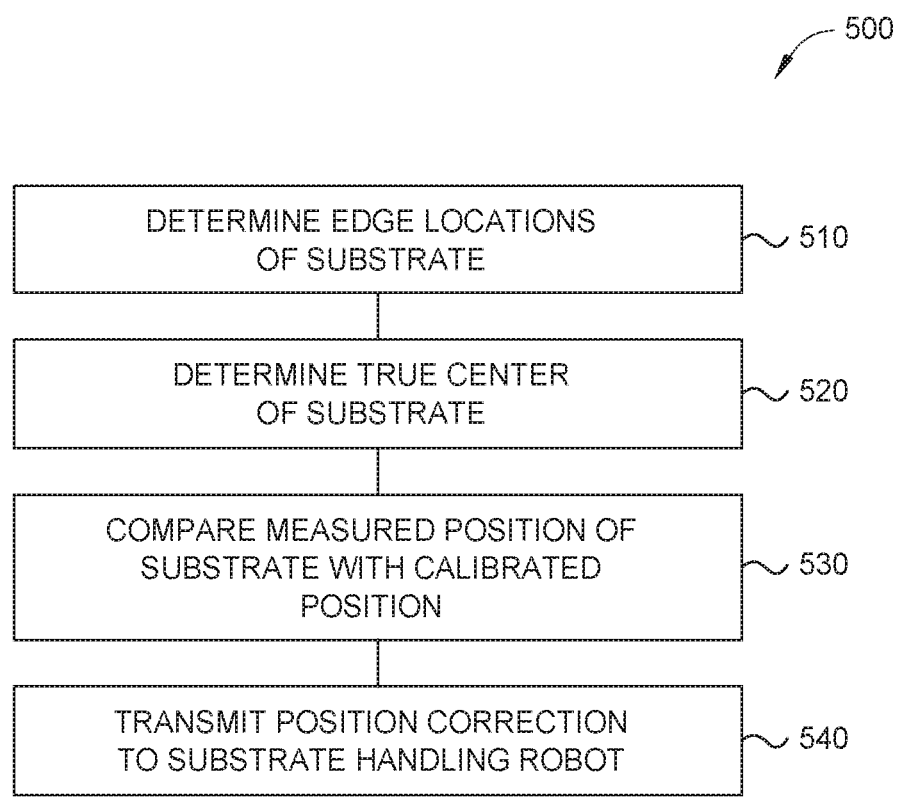
FIG. 5 illustrates a flow diagram of a method for positioning a substrate according to one or more implementations of the present disclosure.

FIG. 5 illustrates a flow diagram of a method 500 for positioning a substrate according to one or more implementations of the present disclosure. The method 500 may be executed as a software routine by the system controller 160 and the substrate-positioning system 130. At operation 510, the edge locations of a substrate are determined. The edge locations may be determined using the method 300 described herein.

At operation 520, the true center of the substrate is determined based on the edge locations determined at operation 510. Standardized center-finder software algorithms, for example, a best fits center finder routine, may be used to determine the center of the substrate 122, based on the measurements obtained, as described above in method 300. For example, the edge locations of the substrate 122 may be used to create mathematical representations of chords across the diameter of the substrate 122. Perpendiculars to the chords may then be checked to determine crossing points of the chords, and from the crossing points, a true center of the substrate 122 may be calculated. Thus, the substrate 122 may be measured and the center of the substrate 122 determined. In other implementations, the center points of diametrically opposed sample points may be used to determine the center, as described above. In still other implementations, a combination of both methods may be used to determine the center of the substrate 122.

In some implementations, the true center of the substrate is determined using a least squares fit to a circle. From the at least three edge point coordinates determined using method 300, the method 500 performs a least squares fit to a circle at operation 520 such the coordinates of all points on the edge of the substrate are determined. From the computed circle, the method 500 determines the location of the center of the substrate. The equations involved in performing a least squares fit to a circle are well known and can be found, for example, in a text by D. Kahaner, et al., entitled "Numerical Methods and Software," published by Prentice Hall (1989).

At operation 530, the measured position of the substrate is compared with a calibrated position to determine if the substrate is aligned. If the substrate is misaligned, a position correction is determined.

At operation 540, the position of the substrate may be adjusted based upon the position correction determined by the system controller 160 (to center the substrate). For example, the position correction may be transmitted to the substrate-handling robot, which may be used to shift the substrate's position by an amount equal to the position correction.

In some implementations, where a batch of substrates to be processed is mixed (e.g., mixed edge types, mixed materials, or combinations thereof), the processes described in method 300 and method 500 may be run for each substrate in the batch. In some implementations, where the batch of substrates is homogeneous (same edge type and material), method 300 and method 500 are performed on the first substrate of the batch in "teach mode" or "learning mode" where the learning from the first substrate (e.g., position correction) may be stored in the system controller 160 and applied to each subsequent substrate in the batch.

Figure 6:
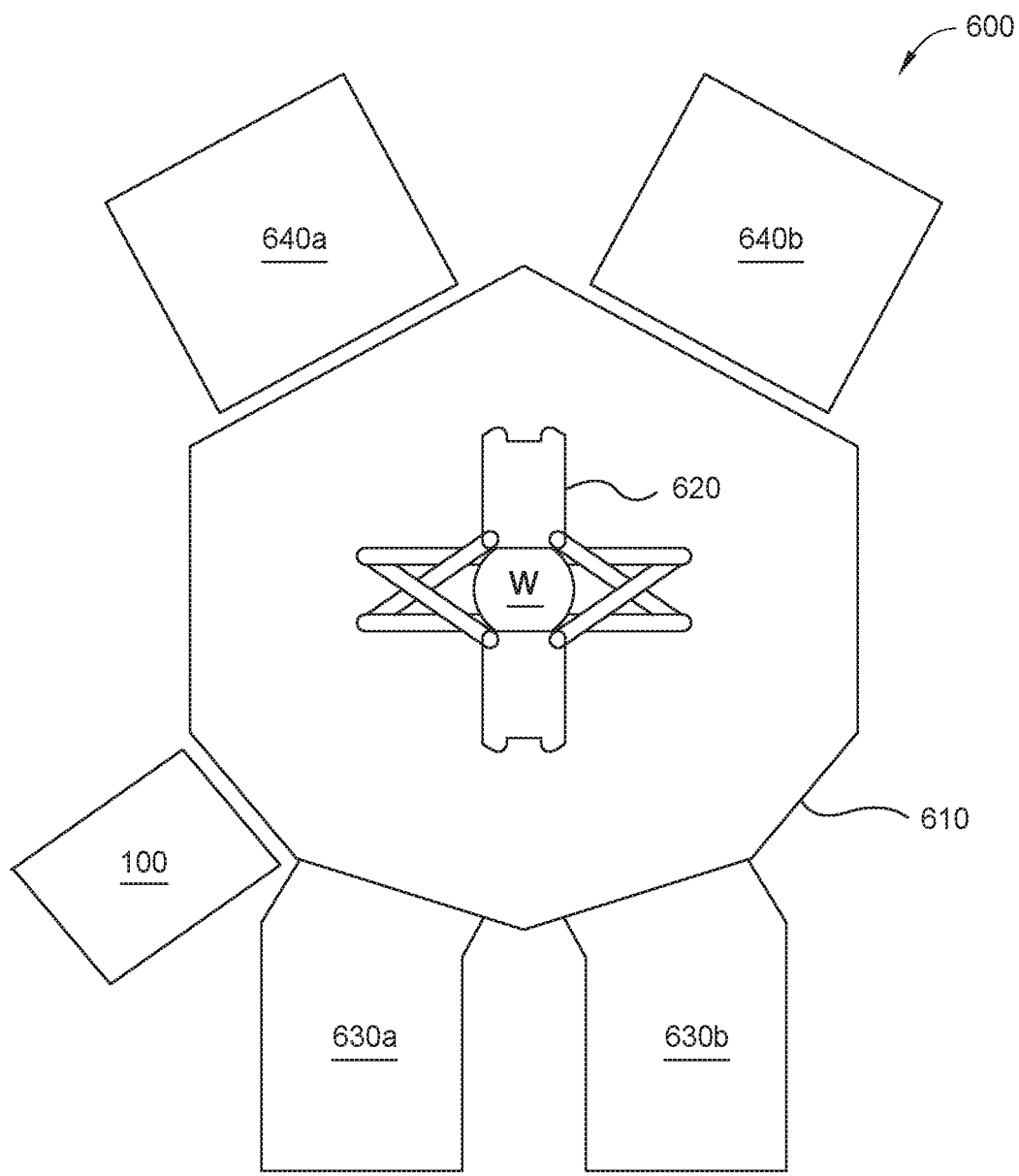
FIG. 6 illustrates a plan view of a semiconductor manufacturing system in which the orienter chamber of the present disclosure may be used.

FIG. 6 illustrates a plan view of a semiconductor manufacturing system 600 in which the orienter chamber 100 of the present disclosure may be used. The semiconductor manufacturing system 600 includes a transport chamber 610 that transports a substrate "W," such as a semiconductor wafer, to each chamber with a transport robot 620 provided inside the transport chamber 610. The substrate "W" may be the substrate 122 as previously described herein. In some implementations, the transport chamber 610 is maintained in a vacuum state. The semiconductor manufacturing system 600 further includes load-lock chambers 630a, 630b (collectively 630) in which the pressure inside the load-lock chamber 630 is changed from an atmospheric state to a vacuum state in order to transport the substrate "W" into the transport chamber 610. The orienter chamber 100 detects and adjusts the position and orientation of the substrates "W" loaded onto the transport robot 620. The system 600 further includes process chambers 640a, 640b (collectively 640) that performs the prescribed processing, for example, film formation using physical vapor deposition (PVD) or chemical vapor deposition (CVD), etching, or other processing on the substrates.

In a semiconductor manufacturing system, for example the semiconductor manufacturing system 600 shown in FIG. 6, the substrate "W" is transported from load-lock chamber 630 to the orienter chamber 100 by the transport robot 620. The substrate "W" is loaded onto the platen 120 (FIG. 1) and the platen 120 is then rotated such that the outer circumference of the substrate "W" is illuminated with light from the array of visible light sources 140. The light from the array of visible light sources 140 that reaches the body of the substrate "W" is refracted and is received on the light-receiving surface 152 of the image sensor array 150. The refracted light is recognized as a refraction zone. The light from the array of visible light sources 140 that reaches the outer circumference of the substrate "W," for example, the edge 123, is reflected and scattered by the outer circumference of substrate "W" and is received on the light-receiving surface 152 of the image sensor array 150 and recognized as either a reflected zone or a shadow zone. The light from the array of visible light sources 140 that passes outside of the substrate "W" is received on light-receiving surface 152 unchanged (e.g., not refracted, reflected, or scattered), and this light is recognized as a transmission zone by image sensor array 150.

Illumination of the substrate "W" by the light from the array of visible light sources 140 is performed until the edges of the substrate "W" are determined. Information related to the shadow zone, the refraction zone, the reflection zone, and the transmission zone received by the image sensor array 150 is sent to the system controller 160, where it may be saved and analyzed to determine the edge location of the substrate W. The system controller 160 determines the true center of the substrate W based on the determined edge locations. The system controller 160 then determines the orientation and eccentricity of the substrate "W" based on the positions of the true center of the substrate "W." It is thus possible for the substrate "W" to be loaded in the desired position and orientation on the transport robot 620 by adjusting the operation of transport robot 620 when the substrate "W" is collected from the orienter chamber 100.

Implementations and all of the functional operations described in this specification can be implemented in digital electronic circuitry, or in computer software, firmware, or hardware, including the structural means disclosed in this specification and structural equivalents thereof, or in combinations of them. Implementations described herein can be implemented as one or more non-transitory computer program products, for example, one or more computer programs tangibly embodied in a machine readable storage device, for execution by, or to control the operation of, data processing apparatus, e.g., a programmable processor, a computer, or multiple processors or computers.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. Processors suitable for the execution of a computer program include, by way of example, both general and special purpose microprocessors, and any one or more processors of any kind of digital computer.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

In some implementations, improved systems and methods for locating the center of an optically transparent substrate are provided. With the advent of optically transparent substrates, conventional center-finding methods, which rely on either detection of edge shadows or detection of edge reflection have become unreliable and difficult to tune due to a lack of general contrast. The substrate-positioning system described herein uses an array of visible light sources to illuminate the substrate and its edges. The light sources are non-laser in nature and typically emit in the visible spectrum, which improves operator safety. In addition, operation in the visible spectrum makes setup and maintenance far easier than would otherwise be possible. The light sources are typically LEDs so that the individual elements may be switched on or off extremely rapidly, which allows for multiple images to be taken using different light sources at any given substrate rotation position. The substrate-positioning system described herein also uses a large format sensor with the ability to process data rapidly, which allows for the digitization (quantization) of each pixel being viewed. Algorithms then analyze the values for patterns and determine the true edge position at each rotational angle of the substrate. The systems and methods described herein are able to locate the center of various types of substrates composed of different materials and/or edge types. Thus, the systems and methods of edge detection, trigger thresholds, and even algorithms are able to adjust on an individual substrate as it passes through the center finder apparatus repeatedly in the course of being processed. In addition, the methods and systems described herein may be used with existing systems and applications, not only from a physical standpoint, but also from a software and communication standpoint.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to implementations of the present disclosure, other and further implementations of the disclosure may be devised without departing from the basic scope thereof, and the scope thereof is determined by the claims that follow.

The invention claimed is:

1. A system, comprising:
an array of visible light sources each visible light source of the array of visible light sources independently operable to emit a visible light and positioned to illuminate an outer circumference of a substrate with the visible light;
an image sensor array comprising a plurality of pixels operable to receive the visible light and secondary emissions from the substrate and provide an output signal comprising pixel data; and
a system controller operable to determine a center of the substrate based on at least three edge point coordinates of the substrate, wherein the system controller is further operable to:
control rotation of the substrate to a plurality of known rotational angular positions;
control the array of visible light sources to perform multiple scans at each rotational angular position of the plurality of known rotational angular positions, comprising:
performing a first scan of the multiple scans using a first visible light source of the array of visible light sources, comprising emitting visible light from the first visible light source at a first angle relative to a plane defined by an edge of the substrate; and
performing a second scan of the multiple scans using a second visible light source of the array of visible light sources, comprising emitting visible light from the second visible light source at a second angle relative to the plane defined by the edge of the substrate, wherein the first angle is different than the second angle; and
analyze the pixel data received from the image sensor array for each scan to determine the at least three edge point coordinates.

2. The system of claim 1, wherein the visible light sources are light-emitting diodes.

3. The system of claim 2, wherein the image sensor array is a charge-coupled device (CCD) camera or a complementary metal-oxide semiconductor (CMOS) camera.

4. The system of claim 3, wherein the image sensor array is a linear sensor array.

5. The system of claim 3, wherein the image sensor array is a two-dimensional array.

6. An orientation chamber, comprising:
a housing enclosing an interior volume;
a rotatable platen disposed inside the housing comprising a substrate support surface operable to support a substrate;
an array of visible light sources disposed above the rotatable platen, each operable to emit a visible light and positioned to illuminate an outer circumference of the substrate with the visible light;

an image sensor array positioned below the rotatable platen and comprising a plurality of pixels operable to receive the visible light and secondary emissions from the substrate and provide an output signal comprising pixel data; and a system controller operable to determine a center of the substrate based on at least three edge point coordinates of the substrate, wherein the system controller is further operable to:

control rotation of the substrate to a plurality of known rotational angular positions;

control the array of visible light sources to perform multiple scans at each rotational angular position of the plurality of known rotational angular positions, comprising:

performing a first scan of the multiple scans using a first visible light source of the array of visible light sources, comprising emitting visible light from the first visible light source at a first angle relative to a plane defined by an edge of the substrate; and performing a second scan of the multiple scans using a second visible light source of the array of visible light sources, comprising emitting visible light from the second visible light source at a second angle relative to the plane defined by the edge of the substrate, wherein the first angle is different than the second angle; and analyze the pixel data received from the image sensor array for each scan to determine the at least three edge point coordinates.

7. The chamber of claim 6, wherein the array of visible light sources are positioned within the interior volume.

8. The chamber of claim 7, wherein the image sensor array is positioned below the rotatable platen and external to the interior volume.

9. The chamber of claim 7, wherein the image sensor array is positioned below the rotatable platen and within the interior volume.

10. The chamber of claim 6, wherein the visible light sources are light-emitting diodes.

11. The chamber of claim 10, wherein the image sensor array is a charge-coupled device (CCD) camera or a complementary metal-oxide semiconductor (CMOS) camera.

12. The chamber of claim 11, wherein the image sensor array is a linear sensor array.

13. The chamber of claim 11, wherein the image sensor array is a two-dimensional array.

14. The chamber of claim 6, wherein the substrate is a transparent substrate.

15. A method, comprising:

rotating a substrate positioned on a rotatable platen to a first rotational angular position;

performing multiple scans at the first rotational angular position using different light source positions in an array of visible light sources disposed above the rotatable platen, comprising:

performing a first scan of the multiple scans using a first visible light source of the array of visible light sources, comprising:

illuminating an outer circumference of the substrate with visible light emitted from the first visible light source at a first angle relative to a plane defined by an edge of the substrate; and performing a second scan of the multiple scans using a second visible light source of the array of visible light sources, comprising:

illuminating the outer circumference of the substrate with visible light emitted from the second visible light source at a second angle relative to the plane defined by the edge of the substrate, wherein the first angle is different than the second angle; and receiving the visible light from the visible light sources and/or secondary emissions from the substrate with a plurality of pixels disposed in an image sensor array, wherein the image sensor array is positioned below the rotatable platen; and analyzing the pixel data received from the image sensor array to determine at least one edge point coordinate of the substrate.

16. The method of claim 15, further comprising performing multiple scans at additional rotational angular positions to obtain at least two more edge point coordinates.

17. The method of claim 16, further comprising:

determining a mathematical center of the substrate based on the at least three edge point coordinates.

18. The method of claim 17, further comprising:

transmitting the mathematical center as a position correction to a substrate-handling robot.

19. The method of claim 16, wherein the visible light sources are light-emitting diodes.

20. The method of claim 16, wherein the image sensor array is a charge-coupled device (CCD) camera or a complementary metal-oxide semiconductor (CMOS) camera.

\* \* \* \* \*